United States Patent [19]

Sugio et al.

[11] 4,293,660

[45] Oct. 6, 1981

[54] POLYPHENYLENE ETHER RESIN COMPOSITION

[75] Inventors: Akitoshi Sugio, Ohmiya; Masanobu Masu, Tokyo; Masatugu Matunaga, Matsudo, all of Japan

[73] Assignee: Mitsubishi Gas Chemical Co., Inc., Tokyo, Japan

[21] Appl. No.: 140,865

[22] Filed: Apr. 16, 1980

[30] Foreign Application Priority Data

Apr. 18, 1979 [JP] Japan ................................. 54-47411

[51] Int. Cl.$^3$ .................... C08L 53/00; C09L 61/04
[52] U.S. Cl. .......................................... 525/68; 525/92
[58] Field of Search ..................................... 525/68, 92

[56] References Cited

U.S. PATENT DOCUMENTS

| | | | |
|---|---|---|---|
| 3,361,851 | 1/1968 | Gowan | 525/132 |
| 3,383,435 | 5/1968 | Cizek | 525/132 |
| 3,909,463 | 9/1975 | Hartman | 525/133 |
| 4,100,226 | 7/1978 | Li | 525/68 |

FOREIGN PATENT DOCUMENTS 43-17812  7/1968  Japan ................................. 525/133

*Primary Examiner*—J. Ziegler
*Attorney, Agent, or Firm*—Wenderoth, Lind & Ponack

[57] ABSTRACT

A resin composition comprising
(a) a polyphenylene ether resin or a mixture of it with a polystyrene resin, and
(b) a grafted block copolymer of an unsaturated polyolefin and butyl rubber obtained by graft copolymerization in the presence of a bifunctional phenolic compound as a grafting vehicle.

7 Claims, No Drawings

POLYPHENYLENE ETHER RESIN COMPOSITION

This invention relates to a resin composition comprising a polyphenylene ether resin having superior solvent resistance and fatigue resistance.

Polyphenylene ether resins are thermoplastic resins having superior mechanical and electrical properties and high heat distortion temperatures, but have the defect of poor processability, slightly inferior impact strength and poor solvent resistance and fatigue resistance. As is well known in the art, the polyphenylene ether resins are mixed with other resins in order to remove such a defect.

In an attempt to improve the impact strength and solvent resistance of polyphenylene ether resins, it was suggested to mix polyphenylene ether with a polyolefin (U.S. Pat. No. 3,361,851). The resulting composition has improved resistance to n-hexane solvent, but when the composition makes contact with solvents which strongly attack the polyphenylene ether, such as gasoline or light oils, the composition immediately breaks at those parts which are subject to stress or in which residual strain remains. Accordingly, the solvent resistance of the polyphenylene ether resin is not fully improved by this method. Mixing of polyphenylene ether with a styrene resin (U.S. Pat. Nos. 3,383,435 and 4,038,343, and Japanese Patent Publication No. 17812/68) was suggested as a method for improving the moldability of polyphenylene ether. This method results in improved modability, but the fatigue resistance characteristics, such as resistance to tensile fatigue and repeated impact fatigue, of the resulting composition are not entirely satisfactory.

In the automobile industry, efforts have been made in recent years to make products of lighter weight for reduced fuel consumption, and great quantities of plastics have come into use in these fields. Plastics used in the automobile industry, especially engineering plastics as structural materials, are also required to have strong resistance to solvents such as light oils and gasoline and fatigue resistance to vibration or impact over long periods of time.

It is an object of this invention therefore to provide a polyphenylene ether resin composition having improved solvent resistance and fatigue resistance while retaining the inherent excellent mechanical properties of the polyphenylene ether resin, which can be applied widely to the automobile industry.

The present inventors extensively investigated blends of polyphenylene ether resin with other resins in order to achieve the above object, and consequently found that the solvent resistance and fatigue resistance of a polyphenylene ether can be markedly improved by blending the polyphenylene ether resin, either alone or in combination with a polystyrene resin, with a certain specified proportion of a grafted block copolymer of an uncured unsaturated butyl rubber and an unsaturated polyolefin.

The present invention thus provides a novel resin composition comprising (a) a polyphenylene ether resin or a mixture of it with a polystyrene resin, and (b) a grafted block copolymer of an unsaturated polyolefin and butyl rubber obtained by graft copolymerization in the presence of a bifunctional phenolic compound as a grafting vehicle.

In the resin composition of this invention, the amount of the grafted block copolymer is selected within the range of 1 to 15% by weight based on the weight of the resin composition.

Polyphenylene ether resin shows only very poor solvent resistance to gasoline. But when the grafted block copolymer used in this invention is mixed in an amount of, for example, 5% with the polyphenylene ether resin, its solvent resistance is improved surprisingly to such an extent that it does not break on long-term direct contact with gasoline. This means that the advantage achieved by the resin composition of this invention cannot at all be expected from the fact that a blend of the polyphenylene ether resin with 5% of polyethylene which is thought to be effective for improving the solvent resistance of polyphenylene ether resin breaks within 20 to 30 seconds on direct contact with gasoline and its solvent resistance is improved only to a slight degree over the polyphenylene ether resin alone.

The resin composition of this invention also exhibits superior fatigue resistance. While a conventional polyphenylene ether resin, either alone or as a mixture with a polystyrene resin, breaks after 200,000 cycles in a repeated tensile fatigue test under a load of 170 kg/cm$^2$, the resin composition of this invention withstands at least 1 million cycles, and even 3 to 4 million cycles, in the same test.

The resin composition of this invention also exhibits superior heat and oxidation stability.

The polyphenylene ether resin used in the resin composition of this invention is known per se, and is a generic term for polymers having in the skeleton repeating structural units of the general formula

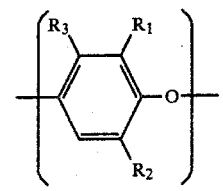

wherein $R_1$ and $R_2$ represent a lower alkyl group, and $R_3$ represents a hydrogen atom or a lower alkyl group. It may be a homopolymer composed only of one kind of the aforesaid structural unit, or a copolymer composed of two or more kinds of the aforesaid unit. Examples include homopolymers typified by poly(2,6-dimethyl-1,4-phenylene) ether, poly(2-methyl-6-ethyl-1,4-phenylene) ether and poly(2,5-dimethyl-1,4-phenylene) ether and copolymers typified by a copolymer derived from 2,6-dimethylphenol and 2,3,6-trimethylphenol, or a copolymer derived from 2-methyl-6ethylphenol and 2,3,6-trimethylphenol.

The polystyrene resin used optionally in the resin composition of this invention is known per se, and denotes styrene polymers containing at least 25% by weight of repeating structural units of the general formula

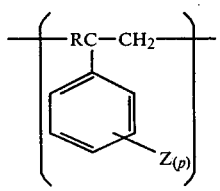

where R represents a hydrogen atom or a lower alkyl group, Z represents a halogen atom or a lower alkyl group, and p is 0 or a positive integer of 1 to 3. Examples of the polystyrene resin include a styrene homopolymer, and multicomponent copolymers of styrene or its derivative with at least one monomer of the group consisting of conjugated diene monomers, vinyl cyanide, acrylates, methacrylates, etc, such as a styrene-butadiene copolymer and ABS resin, and resins generically termed rubber modified high-impact polystyrene. Rubber-modified high-impact polystyrene and styrene homopolymer are preferred. When a mixture of polyphenylene ether resin and the polystyrene resin is used as component (a) in the composition of this invention, the proportion of the polyphenylene ether resin is desirably 25 to 95%, preferably 30 to 90%, based on the total weight of the resin composition. Generally, therefore, mixtures composed of 25 to 95 parts by weight, preferably 30 to 90 parts by weight, of the polyphenylene ether resin and 5 to 75 parts by weight, preferably 10 to 70 parts by weight, of the polystyrene resin are suitable.

The polystyrene resin-containing polyphenylene ether resin is known and is described, for example, in the above-cited U.S. Pat. Nos. 3,383,435 and 4,038,343 and Japanese Patent Publication No. 17812/68.

The grafted block copolymer used in the resin composition of this invention denotes a polymer obtained by graft copolymerization of an unsaturated polyolefin and an uncured butyl rubber containing at least one unsaturated bond per molecule in the presence of a bifunctional phenolic compound which acts as a grafting vehicle. More specifically, it may be a polymer obtained by mixing 40 to 99 parts by weight of the unsaturated polyolefin 60 to 1 part by weight of butyl rubber and 0.3 to 5 parts by weight of the bifunctional phenolic compound, the amounts of these ingredients being based on 100 parts by weight of the polyolefin and the butyl rubber combined, and heating the resulting mixture. A method for producing the grafted block copolymer is disclosed in U.S. Pat. No. 3,909,463. This grafted block copolymer is sold by Allied Chemical Corporation under the trademark "ET Resin", and can also be used in this invention. If desired, a polymer obtained by subjecting this grafted block copolymer and the unsaturated polyolefin further to grafting reaction can also be used in this invention.

The unsaturated polyolefin used in preparing the grafted block copolymer is a polymer derived from at least one alpha-olefin selected from the group consisting of ethylene, propylene and butene-1. It may, for example, be homopolymers typified by polyethylene, polypropylene and polybutene-1, and copolymers such as an ethylene/propylene copolymer. The unsaturated polyolefin should have a number average molecular weight of at least 8,000 and contain 0.05 to 0.5% by weight of unsaturated bonds on an average per molecular chain. Preferably, it is polyethylene produced by any known low-pressure, medium-pressure, and high-pressure methods, and having a low to a high density.

The butyl rubber used in preparing the grafted block copolymer is known per se, and denotes a synthetic rubber obtained by copolymerizing isobutylene with a small amount of a diolefin. It is said that the butyl rubber usually contains 1 to 8% by weight of the diolefin.

The bifunctional phenolic compound used as a grafting vehicle denotes a monomeric phenol dialcohol such as 2,6-dimethylol-4-tert.-butyl phenol, 2,6-dimethylol-4-phenyl phenol or 2,6-dimethylol-4-cyclohexyl phenol, a polymeric compound obtained by the condensation of a parasubstituted phenol with formaldehyde, or a halogen-substituted product thereof. It has an active hydroxyl group or halogen at the ortho-position of phenolic compound.

The resin composition of this invention can be prepared by mixing the aforesaid ingredients by conventional methods known in the art, for example a method which involves feeding pellets, or both pellets and powder, of these ingredients into an extruder and kneading and extruding them, a method which comprises kneading the ingredients by using a kneader or rolls, and a method which comprises mixing these ingredients in the form of solution.

As required, the resin composition of this invention may contain various additives such as heat stabilizers, fire retardants, plasticizers, lubricants and pigments and dyes. Reinforcing material may also be incorporated, if desired.

The following Examples and Comparative Examples specifically illustrate the resin composition of this invention.

In these examples, all parts and percentages are by weight unless otherwise specified.

The various properties given in these examples were determined by the following testing methods.

(1) Solvent Resistance Test

A test sample, $0.3 \times 1.3 \times 12.6$ cm in size, was prepared, and bended by a three-point supporting method in which a load was exerted at a point intermediate between two support stations separated from each other by a distance of 9 cm until the amount of strain reached a predetermined value. The test sample under the strain was allowed to stand in gasoline, and the time which elapsed until it broke was measured and expressed in seconds.

(2) Repeated Impact Fatigue Test

A notched test sample, $0.6 \times 1.3 \times 12.4$ cm, was set in a repeated impact fatigue tester (made by Toyo Seiki Seisakusho), and a weight of a varying amount from 120 g to 200 g was repeatedly let fall from a fixed falling height (10 cm), and the number of repeated impacts at an impact strength of $F=2000$ g.cm/cm was measured.

(3) Izod Impact Strength (notched)

It was measured by using the procedure set forth in ASTM D 256 with a notched $\frac{1}{8}$ inch bar.

(4) Heat Distortion Temperature

It was measured by using the procedure set forth in ASTM D 648 at 264 p.s.i..

(5) Flexural Strength

It was measured by using the procedure set forth in ASTM D 790.

EXAMPLE 1 AND COMPARATIVE EXAMPLE 1

95 Parts of poly(2,6-dimethyl-1,4-phenylene) ether having an intrinsic viscosity, measured in chloroform at 25° C., of 0.50 dl/g and 5 parts of a grafted block copolymer of low-density polyethylene and butyl rubber in a ratio of 1:1 ("ET Resin L-1100", a trademark for a product of Allied Chemical Corporation; having an apparent shear viscosity, at 240° C. and a shear rate of 136 sec$^{-1}$, of 17,400 poises) were fully mixed by a Henschel mixer, and extruded at a temperature of 280° to 310° C. to form pellets. The pellets were injection-molded under an injecting pressure of 1,320 kg/cm$^2$ while maintaining the cylinder temperature at 270° to 330° C. and the mold temperature at 100° C. to form test specimens. The physical properties of the specimens were evaluated, and are shown in Table 1. For comparison, Table 1 shows the results obtained by using poly(2,6-dimethyl-1,4-phenylene) ether alone.

TABLE 1

| | Solvent resistance test (seconds) | | Number of cycles of repeated impact (at $E = 2,000$ g cm/cm) |
|---|---|---|---|
| | strain 0.2 cm | strain 0.5 cm | |
| Example 1 | above 14400 | 30–40 | 400 |
| Comparative Example 1 | 20 | 6 | 50 |

The results show that the solvent resistance and fatigue resistance of the polyphenylene ether resin were improved by the addition of the grafted block copolymer.

COMPARATIVE EXAMPLES 2 to 5

Commercially available polyethylene ["YUKALON PM-60", a tradmark for a product of Mitsubishi Petrochemical Co., Ltd.; melt index 7 (JIS K-6760-1971)] was added in each of the amounts indicated in Table 2 to a phenylene ether copolymer having an intrinsic viscosity, measured in chloroform at 25° C., of 0.50 dl/g (a random copolymer derived from 95 mole% of 2,6-dimethylphenol and 5 mole% of 2,3,6-trimethylphenol on monomer basis), and they were fully mixed by a Henschel mixer. The mixture was extruded at a temperature of 270° to 310° C. to form pellets. The pellets were injection-molded under an injection pressure of 1,320 kg/cm$^2$ while maintaining the cylinder temperature at 270° to 330° C. and the mold temperature at 100° C. to form test specimens. The physical properties of the test specimens were evaluated, and are shown in Table 2.

EXAMPLES 2 to 6

The same phenylene ether copolymer as used in Comparative Example 2 and the same grafted block copolymer of low-density polyethylene and butyl rubber as used in Example 1 were fully mixed in the ratios indicated in Table 2 using a Henschel mixer. The mixture was extruded and injection-molded in the same way as in Comparative Example 2, and the physical properties of the molded articles were evaluated. The results are also shown in Table 2.

TABLE 2

| Example (Ex.) or Comparative Example (CEx.) | Amount of polyphenylene ether (parts) | Amount of the grafted block copolymer (parts) | Solvent resistance test (sec.) | | Number of cycles of repeated impact (at $E = 2000$ g · cm/cm) |
|---|---|---|---|---|---|
| | | | strain 0.2 cm | strain 0.5 cm | |
| Ex. 2 | 99 | 1 | 40 | 8 | 85 |
| Ex. 3 | 98 | 2 | 200 | 10–20 | 150 |
| Ex. 4 | 95 | 5 | above 14400 | 30–40 | 390 |
| Ex. 5 | 90 | 10 | above 14400 | above 14400 | 530 |
| Ex. 6 | 85 | 15 | above 14400 | above 14400 | 500 |
| | | Polyethylene | | | |
| CEx. 2 | 100 | 0 | 20 | 6 | 50 |
| CEx. 3 | 99 | 1 | 20 | 6 | 84 |
| CEx. 4 | 95 | 5 | 30 | 8 | 275 |
| CEx. 5 | 90 | 10 | 40 | 6 | 450 |

It is seen from Table 2 that the resin compositions of this invention exhibited superior solvent resistance and fatigue resistance by the inclusion of at least 1% of the grafted block copolymer. Other physical properties of the resin compositions are shown in Table 3.

TABLE 3

| Example (Ex.) or Comparative Example (CEx.) | Izod impact strength (notched; kg · cm/cm) | Heat distortion temperature at 264 psi (°C.) | Flexural strength (kg/cm$^2$) |
|---|---|---|---|
| CEx. 2 | 5.7 | 192 | 1050 |
| Ex. 2 | 5.7 | 187 | 1070 |
| Ex. 3 | 5.8 | 187 | 1050 |
| Ex. 4 | 11.2 | 186 | 980 |
| Ex. 5 | 15.3 | 184 | 840 |
| Ex. 6 | 13.4 | 182 | 690 |

EXAMPLES 7 to 9

Three kinds of test specimens were prepared in the same way as in Example 1 except that the mixing ratio between the poly(2,6-dimethyl-1,4-phenylene) ether and the grafted block copolymer was varied. The results are shown in Table 4.

TABLE 4

| Example | Amount of polyphenylene ether (parts) | Grafted block copolymer (parts) | Solvent resistance test (seconds) | | Number of cycles of repeated impact (at $E = 2000$ g · cm/cm) |
|---|---|---|---|---|---|
| | | | strain 0.2 cm | strain 0.5 cm | |
| 7 | 99 | 1 | 40 | 8 | 95 |
| 1 | 95 | 5 | above 14400 | 30–40 | 400 |
| 8 | 90 | 10 | above 14400 | above 14400 | 550 |
| 9 | 85 | 15 | above 14400 | above 14400 | 520 |

EXAMPLES 10 to 13

95 Parts of phenylene ether copolymer having an intrinsic viscosity, measured in chloroform at 25° C., of 0.51 dl/g (a random copolymer derived from 95 mole % of 2,6-dimethylphenol and 5 mole % of 2,3,6-trimethylphenol on monomer basis), 5 parts of each of the four grafted block copolymers shown in Table 5, 9 parts of triphenyl phosphate, 1 part of a stabilizer, and 0.2 part of carbon block were mixed by a Henschel mixer, and extruded at a temperature of 250° to 300° C. to form pellets. The pellets were injection-molded under an injecting pressure of 1320 kg/cm$^2$ while maintaining the cyclinder temperature at 260° to 310° C. and the mold temperature at 100° C. to form test specimens. The physical properties of the test specimens were evaluated, and are shown in Table 5.

TABLE 5

| Example | Type of grafted block copolymer | Number of cycles of repeated impact (at E = 2000 g . cm/cm) |
|---|---|---|
| 10 | ET Resin L-1100 (*1) | 420 |
| 11 | ET Resin L-3100 (*2) | 430 |
| 12 | ET Resin H-1100 (*3) | 370 |
| 13 | ET Resin H-3100 (*4) | 380 |

The details of the ET Resins (produced and sold by Allied Chemical Corporation) are as follows:

| Type of polyethylene | Polyethylene/butyl rubber ratio | Shear rate (sec$^{-1}$) | Apparent shear viscosity at 240° C. (poises) |
|---|---|---|---|
| (*1) Low-density | 1:1 | 136 | 17406 |
| (*2) Low-density | 3:1 | 958 | 2463 |
| (*3) High-density | 1:1 | 69 | 34043 |
| (*4) High-density | 3:1 | 441 | 5346 |

The results shown in Table 5 demonstrate that the inclusion of a plasticizer, stabilizer and pigment in the composition of this invention did not adversely affect its fatigue resistance, but rather its fatigue resistance was improved.

To examine the heat stability of the resin compositions, the test specimens were allowed to stand in an oven at 115° C. for 10, 20 and 30 days, respectively, and the changes with time of the properties of these specimens were examined. The results show very good heat stability. The absolute values of the Izod impact strength (notched) of these test specimens are shown in Table 6. The parenthesized figures show percent retentions of these values.

TABLE 6

| Example | Initial value (kg . cm/cm) | 10 days | 20 days | 30 days |
|---|---|---|---|---|
| 10 | 10.7 | 11.3 (106%) | 10.7 (100%) | 8.7 (81%) |
| 11 | 10.4 | 9.6 (92%) | 9.6 (92%) | 9.6 (92%) |
| 12 | 9.0 | 8.8 (98%) | 8.8 (98%) | 8.7 (97%) |
| 13 | 8.9 | 8.7 (98%) | 8.7 (98%) | 8.6 (97%) |

COMPARATIVE EXAMPLES 6 to 9

The same phenylene ether copolymer as used in Comparative Example 2 and commercially available high-impact polystyrene (containing 13% of a grafted rubber gel phase; the polystyrene matrix has an intrinsic viscosity, measured at 25° C. in chloroform, of 0.89 dl/g) were blended in the ratios shown in Table 7 by a Henschel mixer, and extruded at a temperature of 200° to 290° C. to form pellets. The pellets were injection-molded under an injecting pressure of 1,320 kg/cm$^2$ while maintaining the cylinder temperature at 230° to 310° C. and the mold temperature at 80° to 100° C. The physical properties of the molded articles were evaluated, and are shown in Table 7.

COMPARATIVE EXAMPLE 10

In the mixing operation of Comparative Example 9 the amount of the high-impact polystyrene was changed to 20 parts, and 5 parts of commercially available polyethylene ("YUKALON MV-30"; a trademark for a product of Mitsubishi Petrochemical Co., Ltd.; melt index 45 by JIS K-6760-1971) was added further. The ingredients were fully mixed by a Henschel mixer, and pelletized and molded under substantially the same conditions as in Comparative Example 9. The properties of the molded article are also shown in Table 7.

EXAMPLES 14 to 16

The same phenylene ether copolymer and high-impact polystyrene as used in Comparative Example 6 and the same grafted block copolymer as used in Example 1 were blended in the ratios shown in Table 7, and pelletized and molded under substantially the same conditions as in Comparative Examples 6 to 9. The properties of the molded articles are also shown in Table 7.

TABLE 7

| Example (Ex.) or Comparative Example (CEx.) | Amounts of the ingredients blended (parts) | | | | Number of cycles of repeated impact (at E = 2000 g . cm/cm) | Tensile fatigue test (load 170 kg/cm$^2$) |
|---|---|---|---|---|---|---|
| | Polyphenylene ether | Polystyrene | Polyethylene | Grafted block copolymer | | |
| CEx. 6 | 25 | 75 | — | — | 126 | 17 × 10$^4$ |
| CEx. 7 | 40 | 60 | — | — | 108 | 16 × 10$^4$ |
| CEx. 8 | 50 | 50 | — | — | 95 | 15 × 10$^4$ |
| CEx. 9 | 75 | 25 | — | — | 68 | 20 × 10$^4$ |
| CEx. 10 | 75 | 20 | 5 | — | — | 5 × 10$^4$ |
| Ex. 14 | 25 | 70 | — | 5 | 190 | 96 × 10$^4$ |
| Ex. 15 | 50 | 45 | — | 5 | 313 | 323 × 10$^4$ |
| Ex. 16 | 75 | 20 | — | 5 | 326 | 370 × 10$^4$ |

It is seen from Table 7 that the resin compositions of this invention exhibit superior fatigue resistance. Other physical properties of the resin compositions of this invention are shown in Table 8.

TABLE 8

| Example | Izod impact strength (notched) (kg cm/cm) | Heat distortion temperature (at 264 psi) (°C.) | Flexural strength (kg/cm²) |
| --- | --- | --- | --- |
| 14 | 7.6 | 110 | 820 |
| 15 | 14.7 | 133 | 950 |
| 16 | 14.1 | 161 | 1020 |

EXAMPLES 17 to 18

The same polyphenylene ether resin as used in Example 1, the same high-impact polystyrene as used in Comparative Example 6 and the same grafted block copolymer as used in Example 11 and optionally triphenyl phosphate were blended in the ratios shown in Table 9 by a Henschel mixer, and extruded at a temperature of 200° to 290° C. to form pellets. The pellets were injection-molded under an injecting pressure of 1050 kg/cm² while maintaining the cylinder temperature at 250° to 280° C. and the mold temperature at 90° C. to form test specimens. The physical properties of the test specimens were evaluated. They were found to have superior solvent resistance and fatigue resistance. The results are shown in Table 10.

TABLE 9

| | Amounts of the ingredients (parts) | | | |
| --- | --- | --- | --- | --- |
| Example | Polyphenylene ether | Polystyrene | Grafted block copolymer | Triphenyl phosphate |
| 17 | 60 | 35 | 5 | 6 |
| 18 | 60 | 30 | 10 | — |

TABLE 10

| Example | Solvent resistance test at 0.2 cm strain (seconds) | Number cycles of repeated impact (at E = 2000 g · cm/cm) | Izod impact strength (notched; kg · cm/cm) | Heat distortion temperature at 264 psi (°C.) | Flexural strength (kg/cm²) |
| --- | --- | --- | --- | --- | --- |
| 17 | above 14400 | 390 | 18.1 | 122 | 950 |
| 18 | above 14400 | 370 | 12.0 | 145 | 880 |

What we claim is:

1. A resin composition comprising
   (a) a polyphenylene ether resin, and
   (b) a grafted block copolymer of an unsaturated polyolefin and butyl rubber obtained by graft copolymerization in the presence of a bifunctional phenolic compound as a grafting vehicle.

2. A resin composition comprising
   (a) a mixture of a polyphenylene ether resin and a polystyrene resin, and
   (b) a grafted block copolymer of an unsaturated polyolefin and butyl rubber obtained by graft copolymerization in the presence of a bifunctional phenolic compound as a grafting vehicle.

3. The resin composition of claim 1 or 2 wherein 40 to 99 parts by weight of the unsaturated polyolefin and 1 to 60 parts by weight of the butyl rubber are used per 100 parts by weight of the unsaturated polyolefin and the butyl rubber combined.

4. The resin composition of claim 3 wherein said unsaturated polyolefin is a polymer having a number average molecular weight of at least 8,000 derived from at least one monomer selected from the group consisting of ethylene, propylene and butene-1, and has 0.05 to 0.5% by weight of unsaturated bonds on an average per molecular chain.

5. The resin composition of claim 4 wherein said unsaturated polyolefin is polyethylene.

6. The resin composition of claim 1 or 2 wherein the proportion of said grafted block copolymer is 1 to 15% by weight.

7. The resin composition of claim 2 wherein said component (a) is a mixture of 25 to 95 parts by weight of the polyphenylene ether resin and 75 to 5 parts by weight of the polystyrene resin.

* * * * *